United States Patent [19]

Halpern et al.

[11] 4,276,573
[45] Jun. 30, 1981

[54] PULSE SHAPING NETWORK FOR DISC READ CIRCUITRY

[75] Inventors: Peter H. Halpern, Longwood, Fla.; Charles E. Lawrence, Boerne, Tex.

[73] Assignee: Datapoint Corporation, San Antonio, Tex.

[21] Appl. No.: 53,546

[22] Filed: Jun. 29, 1979

[51] Int. Cl.$^3$ .............................................. G11B 5/09
[52] U.S. Cl. ...................................................... 360/45
[58] Field of Search ......................................... 360/45

[56] References Cited

U.S. PATENT DOCUMENTS

| 3,775,759 | 11/1973 | Armitage, Jr. et al. | 360/45 |
| 4,081,756 | 3/1978 | Price et al. | 360/45 |

OTHER PUBLICATIONS

"Trigonometric Pulse-forming Networks Revisted'-'-Halpern, IEEE Transactions on Circuit Theory, 1/72.

Primary Examiner—Vincent P. Canney
Attorney, Agent, or Firm—Soules & McCamish

[57] ABSTRACT

A pulse shaping network for the read circuitry of a floppy disc memory system in which encoded digital data is recorded in a double density format. The pulse shaping network processes an uncompensated input read signal in order to substantially eliminate cross talk between the bivalent pulses of the read signal, thereby correcting the peak phase shift and peak amplitude distortion that characterizes intersymbol cross talk. The resulting phase and amplitude corrected read signal can then be accurately decoded in order to retrieve the information contained in the peak phases of the read signal. The pulse shaping network includes a sine pulse-forming filter comprised of a capacitively terminated parallel cascade of series LC sections characterized by respective half-period harmonic transfer functions whose impulse responses are substantially finite time duration sine pulses of a successively odd multiple of half cycles. The input read signal pulses are applied to the sine pulse-forming filter, and a buffer circuit is used to separately tap the responses of the first two LC sections. These responses, which correspond to the convolution of the read signal pulses with the first and third half-period harmonic transfer functions of the filter, are then scaled and applied to a difference amplifier that provides the corrected read signal output of the pulse shaping network. An equalization analysis of the read signal pulses yields the optimum harmonic content, including scaling factors, for the combined network transfer function of the filter so as to substantially eliminate intersymbol cross talk by effectively narrowing in time the pulses of the input read signal. Since the network transfer function is formed of only lower order harmonics, the response of the pulse shaping network is band width-limited so that the signal-to-noise ratio is not seriously degraded.

22 Claims, 5 Drawing Figures

PULSE SHAPING NETWORK FOR DISC READ CIRCUITRY

BACKGROUND OF THE INVENTION

The present invention relates to devices for reading encoded digital information recorded at high densities as bivalent states of a moving recording medium, and more particularly to networks that function to reduce cross talk between the bivalent pulses of a read signal in order to correct the peak phase shift and peak amplitude distortion that characterizes intersymbol cross talk, thereby facilitating the accurate decoding and retrieval of the information.

Digital information is commonly stored in the form of a bivalent state of a moving magnetic recording medium such as a floppy disc, disc or magnetic drum. The information is typically written onto the recording medium in accordance with either of two encoding techniques, the so-called single density (standard) and double density (self-clocking) recording formats. In the case of the single density recording format, each data bit is recorded onto the recording medium along with an associated clock bit, with the clock bit providing bit separation and facilitating data retrieval. The requirement of a clock bit for each data bit can be eliminated by using a high density self-clocking recording code. Current high density recording codes permit digital data to be encoded and written onto a recording medium at typically double the density of the single density recording format, i.e. the bit cell interval in double density recording is half the duration of the single density bit cell. As conventionally used in the computer arts, a bit cell is a binary information element occupying a fixed interval of time over which a digital bit can be recorded as a bivalent magnetic flux state of a moving recording medium.

Figure 1:
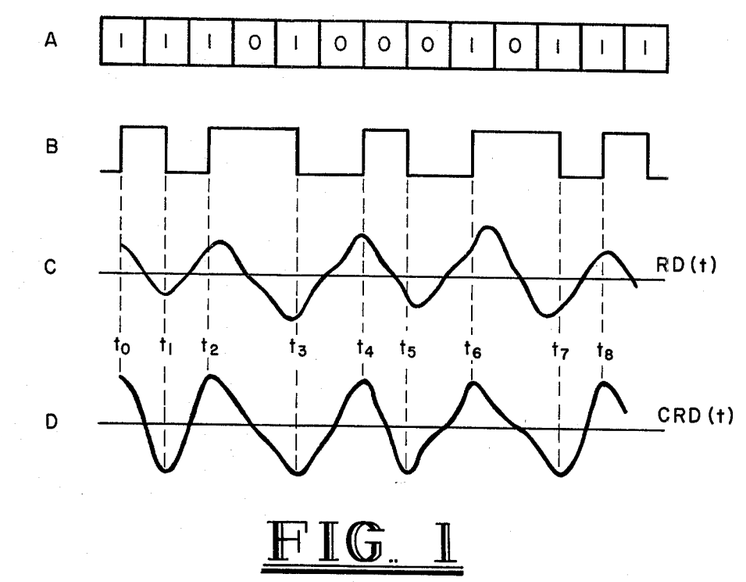
FIG. 1 is a timing diagram in which line A presents a series of bit cells containing a representative sequence of digital information; waveform B designates the digital information according to a double density recording format; waveform C is representative of the read obtained in reading data recorded according to waveform B; and waveform D is representative of a corrected read signal obtained from the pulse shaping network of the present invention in which intersymbol cross talk has been substantially eliminated, thereby equalizing peak amplitudes and correcting peak phases.

The high density codes used to encode digital information are able to designate sequences of digital information in terms of at most one transition, i.e., one change in the magnatic flux state of the recording medium, per bit cell. For example, in one commonly used self-clocking code modified frequency modulation (MFM) a logic one is represented by a transition in the center of a bit cell, while a logic 0 is represented by a transition at the beginning (i.e., the leading edge) of a bit cell unless the immediately preceeding information was a logic 1, in which case the transition is omitted. Thus, any sequence of digital information can be represented in terms of step transitions at intervals corresponding to either 1, 1½, or 2 bit cells. Referring to FIG. 1, a sequence of double density bit cells (each, for example, two microseconds in duration) is shown on line A, while waveform B represents the indicated digital information in terms of a sequence of step transitions at intervals prescribed by the MFM encoding technique. The digital information represented in wavefore B is designated not only by the presence of a transition (as in the single density recording format), but also by the precise timing of the transitions. Accordingly, in order to retrieve information recorded in a double density format the reading process must preserve the intervals between transitions so that the encoded transition sequence can be recognized thereby enabling the data clock to be recovered.

The use of a double density recording format for encoding digital data does not present a problem from the standpoint of writing the information onto the recording medium. The digital data can be straightforwardly written onto the recording medium by applying to a magnetic head a waveform (such as waveform B) that is substantially rectangular, i.e., one having abrupt step transitions at precisely controlled intervals, thereby causing sudden reversals of the magnetic condition of the recording medium according to the same precise timing sequence. Considerable difficulty, however, is encountered in accurately retrieving the timing sequence of the recording code transitions. As noted above, reading double density encoded data requires that the precise intervals between the transitions, and not just the occurance of the transitions, be detected. Thus, referring to FIG. 1, the information encoded in waveform B can be accurately retrieved only if the read circuitry can detect transitions occuring at times $t_0$, $t_1$ (after an interval of approximately two microseconds), $t_2$ (after an interval of approximately two microseconds), $t_3$ (after an interval of approximately four microseconds), $t_4$ (after an interval of approximately three microseconds), and so on.

The difficulty in accurately detecting the precise sequence of the recording code transitions arises because, unlike the write signal waveform used to record the data, the read signal waveform is not at all rectangular. Rather, due to the transfer characteristics of the recording medium and the magnetic head, each transition is translated during the write/read process into an amplitude variation having a Gaussian shape. Thus, the read signal comprises a sequence of elementary Gaussian-shaped transition pulses, the polarities of which alternate, with the information being contained in the phase of the peaks of the transition pulses. Such a sequence of bivalent transition pulses is represented by waveform C in FIG. 1. In the case of data recorded in a double density format, an effect known as pulse crowding causes intersymbol cross talk. That is, because the Gaussian-shaped transition pulses succeed each other at smaller intervals, their superposition in time causes the peak amplitudes of the transition pulses to be reduced (see waveform C). Furthermore, since a transition may occur nearer to the adjacent transition on one side or the other, the superposition of adjacent symmetrical Gaussian waveforms can be nonsymmetrical, with the result that the peak of a transition pulse is shifted in the direction of the larger of the adjacent intervals. Thus, the transition pulse peak in the read signal waveform C that should occur at time $t_2$ is shifted to the right, away from the preceeding single bit cell interval and in the direction of the succeeding two bit cell interval. Similar peak phase shifts occur at the succeeding intervals.

While the problem of unequal peak amplitudes of the transition pulses greatly complicates the design of an automatic gain control network for the read circuitry, amplitude equalization is not critical to the accurate recovery of the data. However, since accurate information retrieval requires that the precise intervals between recording code transitions be preserved to recover the data clock, phase shifts in the peaks of the transition pulses can result in decoding errors. Specifically, if intersymbol cross talk results in the phase of certain transition pulse peaks being shifted more than one quarter of a bit cell (0.5 microseconds), errors in the recognition of the timing sequence of the recording code transitions, and thereby errors in the detection of the information contained in the peak phases of these transitions, and the information may be difficult to recover. Furthermore, if the peaks are shifted a significant fraction of 0.5 microseconds, the decoding process becomes significantly more susceptible to noise.

In order to achieve a reliable double density recording capability, various techniques have been used to counteract the intersymbol cross talk caused by the above described superposition effects and restore the proper phase of the transition pulse peaks. For instance, it has been suggested that a tapped delay line be utilized to obtain a number of time-delayed read signals, which are then scaled and summed in a manner to narrow the width of the Gaussian-shaped transition pulses of the read signal, thereby reducing the superposition effect of each transition pulse on the adjacent transition pulses. This technique has the disadvantage that, since it uses time-delayed reproductions of the complete read signal, including superimposed high frequency noise, the summing process tends to enhance the noise signals to the extent that the reliability of the technique is severly limited.

The most prevalent approach to the peak phase shifting problem of intersymbol cross talk uses phase locked loop (variable frequency oscillator) data separation and write pre-compensation. The VFO, once sychronized, tracks the data and generates clock and data windows improving bit shift tolerance. Simultaneously, write pre-compensation circuitry is used to provide peak shift correction by introducing a compensating phase shift as the data are being recorded onto the disc. That is, the phase of the transitions of the write signal waveform are shifted in a direction opposite to the peak phase shift which is introduced by reason of the transfer characteristics of the recording medium and the nonsymmetrical superposition of the Gaussian-shaped transition pulses of the read signal. Thus, if a certain data pattern would cause a particular transition pulse peak to be shifted to a later position in time than nominal, the write pre-compensation circuit causes the associated coded transition to be recorded on the recording medium earlier in time than nominal, thereby compensating for the unavoidable distortion that results from the read process.

The combined VFO and write pre-compensation technique has a number of disadvantages. First of all, because write pre-compensation results in the transition pulses of the read signal being crowded together more than is the case without pre-compensation, the signal-to-noise ratio of the read signal is significantly degraded. Secondly, the crowding together of the Gaussian-shaped transition pulses, and the resulting increase in superposition effects, causes a further disparity in the peak amplitudes of the transition pulses. Finally, the amount of write pre-compensation to be used in recording the digital data onto the recording medium must be decided beforehand, with the result of this decision being permanently recorded on the disc. Inasmuch as the several manufactures of disc recording equipment do not have a general agreement on how much write pre-compensation is to be used, the interchangeability of discs and disc drives is severely limited.

It is a general object of the present invention to provide a pulse shaping network that substantially reduces intersymbol cross talk between the bivalent transition pulses derived from the process of reading information recorded in a high density format on a moving recording medium. To this end, a specific object of the present invention is to provide such a pulse shaping network that corrects peak phase shift and peak amplitude distortion by processing the read signal, without the necessity of altering the manner in which digital data is written onto the recording medium.

A further object of the present invention is to provide a pulse shaping network that can be readily adapted to effecting peak phase shift and peak amplitude distortion corrections for a variety of recording media, each exhibiting unique transfer characteristics.

Another object of the present invention is to provide a band width-limited pulse shaping network that significantly reduces intersymbol cross talk while avoiding significant degredation of the signal-to-noise ratio.

Still another object of the present invention is to provide such a pulse shaping network whose response to a particular read signal can be readily adjusted with only minor component alterations and/or additions in order to optimize read signal correction.

SUMMARY OF THE INVENTION

Briefly, to achieve these objects and others that will be apparent to those of ordinary skill and the art, the present invention provides a pulse shaping network for the read circuitry of a disc memory system that includes a filter having a substantially finite time duration network transfer function derived from a plurality of separate, lower order half-period harmonic transfer functions, with the response duration of the network transfer function being less than or substantially equal to a bit cell interval. Such a filter can comprise a sine pulse-forming filter formed by a parallel cascade of tuned reactance sections characterized by respective half-period harmonic transfer functions whose impulse responses are substantially finite time duration sine pulses of a successively odd multiple of half cycles. An input read signal is applied to the sine pulse-forming filter and a buffer circuit is used to tap the response of a predetermined number of tuned reactance sections. These responses, which correspond to the convolution of the bivalent transition pulses of the read signal with the associated half-period harmonic transfer functions, are then scaled and summed to obtain a corrected read signal output of the pulse shaping network. An equalization analysis of the input read signal yields the optimum harmonic content, including scaling factors, for the network transfer function so as to substantially reduce intersymbol cross talk. As a result, nonsymmetrical superposition effects are significantly reduced, correcting peak phase shift and peak amplitude distortion and enabling the accurate retrieval of the digital information.

A preferred pulse shaping network includes a sine-pulse forming filter comprised of a parallel cascade of series LC sections terminated in a correcting capacitance. The buffer circuit taps the convolution responses of the first and second LC sections corresponding to the first and third half-period harmonic transfer functions. i.e., those sections characterized by sine pulses having, respectively, one and three half cycles. After introducing the scaling factors prescribed by the equalization analysis, the two convolution responses are subtracted by a difference amplifier to obtain the corrected read signal corresponding to the response of the network transfer function to the input read signal. Since the preferred pulse shaping network utilizes only the responses to the transfer functions corresponding to the lower order first and third half-period harmonics, the corrected read signal response to the network transfer function is band width-limited. So limiting the frequency spectrum of the network transfer function insures that the filtering process does not result in any significant amplification of the high frequency noise superimposed on the read signal waveform. Accordingly, the signal-to-noise ratio is not significantly degraded by the pulse shaping function.

BRIEF DESCRIPTION OF THE DRAWINGS

The invention can best be understood by reference to the following portion of the specification taken in conjunction with the accompanying drawings, in which.

DESCRIPTION OF THE PREFERRED EMBODIMENT

The following is a detailed description of a pulse-shaping network for the read circuitry of a floppy disc memory system such as the 1842 Dual Diskette Drive manufactured by Datapoint Corporation. This memory system has the capability of storing digital information onto, and retrieving the information from, a rotating disc recording medium according to either a standard single density format (with a four microsecond bit cell interval) or a double density format (with a two microsecond bit cell interval). For double density recording, the system uses the well-known MFM format (discussed previously in conjunction with waveform B in FIG. 1), to encode the digital data. The above notwithstanding, those of ordinary skill in the art will readily appreciate that the present invention has direct application in any information storage system in which digital data is stored onto a moving magnetic carrier at a density sufficiently high that the information write/read process results in such a degree of intersymbol cross talk that the read signal waveform is significantly distorted by peak phase shift and/or peak amplitude inequality.

As noted in the background portion of this specification, due to the transfer characteristics of a disc recording medium and the magnetic head, the process of reading the digital information stored on the disc as a sequence of magnetic flux transitions results in a read signal that is comprised of a sequence of bivalent, substantially Gaussian-shaped transition pulses, with the encoded information being contained in the phases of the transition pulse peaks. When a high density code, such as MFM, is used to write the information, the transition pulses of the read signal are crowded together to the extent that intersymbol cross talk (i.e., nonsymmetrical superposition in time) causes a peak phase shift effect that distorts the peak phase relationships of the transition pulses (see waveform C in FIG. 1).

In order to effect the reliable recovery of digital information recorded in a double density format, a read signal correction technique must satisfy two interlated conditions:

(1) Intersymbol cross talk must be reduced by, in effect, narrowing the Gaussian-shaped transition pulses of the input read signal so as to reduce nonsymmetrical superposition effects and, thereby, recover the proper peak phase relationships; and (2) Band width limitations must be observed so that the pulse-shaping can be effected without augmenting the high frequency noise superimposed on the read signal, thereby avoiding any significant degradation of the signal-to-noise ratio.

The read signal correction technique embodied in the pulse shaping network of the present invention comprises:

(1) Applying the read signal to a substantially finite time duration sine pulse-forming filter comprising a plurality of transfer functions whose impulse responses are sine pulses of a successively odd multiple of half cycles, each with a duration of approximately the bit cell interval;

(2) Selecting convolution responses corresponding to the convolution of the transition pulses of the read signal with the first and third half-period harmonic transfer functions (i.e., those sine pulses of respectively, one and three half cycles); and (3) Scaling and combining the selected convolution responses to achieve a corrected read signal corresponding to the response of a combined network transfer function to the input read signal;

such that the two conditions indicated above are satisfied. An equalization analysis of the input read signal provides the optimum harmonic content, including scaling factors, for deriving the network transfer function for the pulse shaping network. The result of the read signal correction technique, then, is a corrected read signal, such as represented by waveform D in FIG. 1, wherein the peak phases of the transition pulses are corrected so that the peaks occur at intervals corresponding to the encoded sequence of transitions (i.e., at times $t_0$, $t_1$, $t_2$, ... $t_8$), and wherein all peak amplitudes have been equalized.

As noted previously, the read signal correction technique of the present invention embodies an equalization analysis of the transition pulses of the input read signal. Essentially, the system of writing encoded data onto a recording medium and then reading the data off the medium can be considered as a delayed recording transmission link characterized by a write/read transfer function. The intersymbol cross talk that causes the distortion of the read signal results because the write/read transfer function is a Gaussian-shaped waveform, i.e., its response to an impulse function (the write signal) is Gaussian-shaped. The function of the pulse shaping network is to provide a corrected read signal comprised of, in effect, narrower transition pulses, thereby reducing intersymbol cross talk, while at the same time limiting the band width of the network response. Thus, the pulse shaping network of the present invention provides a network transfer function that substantially equalizes the impulse-spreading effect of the write/read transfer function.

Figures 2A, 2B:
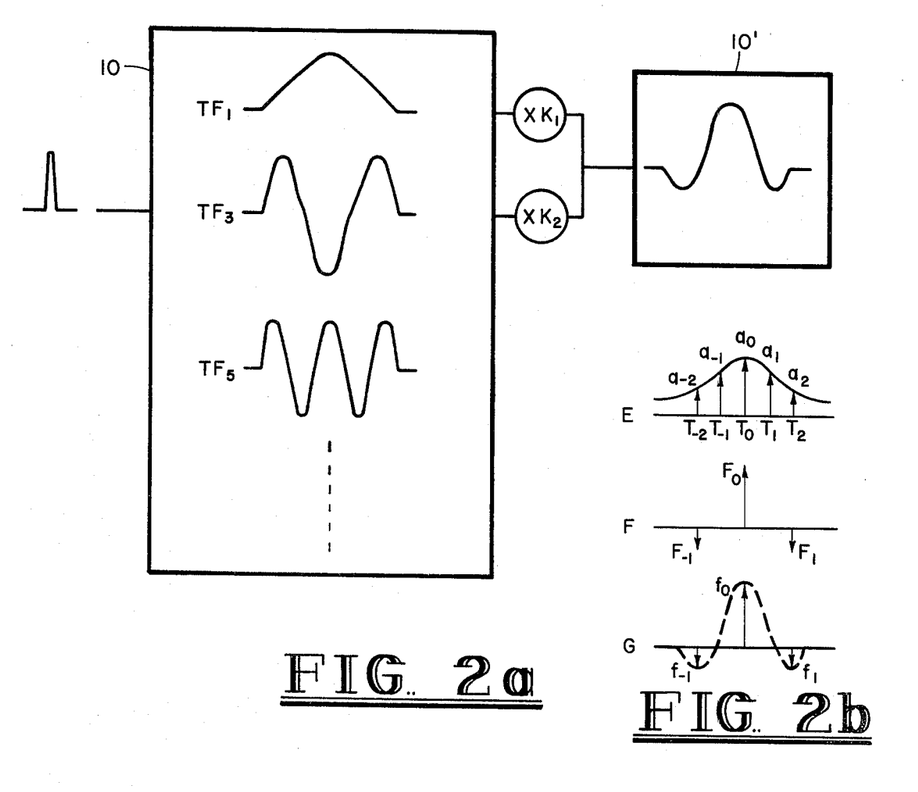
FIG. 2a indicates schematically the synthesis of a network transfer function for the pulse shaping network from separate half-period harmonic transfer functions.
FIG. 2b diagramatically illustrates certain steps in the equalization analysis used to synthesize a network transfer function.

According to well known methods of equalization analysis, the first step is to sample a Gaussian-shaped transition pulse corresponding to the response obtained in reading recorded data (i.e., the response of the write/read transfer function), at intervals symmetrical about the peak of the transition pulse. Thus, in wavefore E of FIG. 2b, a transition pulse TP is designated by sample values $a_{-2}$, $a_{-1}$, $a_0$, $a_1$ and $a_2$, occuring at, respectively, times $T_{-2}$, $T_{-1}$, $T_0$, $T_1$ and $T_2$. These measured sample values of the transition pulse form the coefficients in the following equalization matrix:

$$\begin{vmatrix} a_0 & a_1 & a_2 \\ a_{-1} & a_0 & a_1 \\ a_{-2} & a_1 & a_0 \end{vmatrix} \times \begin{vmatrix} f_{-1} \\ f_0 \\ f_1 \end{vmatrix} = \begin{vmatrix} e_{-1} \\ e_0 \\ e_1 \end{vmatrix} \quad (1)$$

where $f_{-1}$, $f_0$ and $f_1$ correspond to the tap weights of an equalizer transfer function and $e_{-1}$, $e_0$ and $e_1$ correspond to a vector representation of an ideal corrected read signal output. The equalizer transfer function corresponds to a transfer function that can equalize the pulse spreading effect of the write/read transfer function, i.e., that can effectively narrow the transition pulses of the read signal to eliminate intersymbol cross talk. An ideal corrected read signal output ($e_{-1}$, $e_0$, $e_1$) would correspond to an impulse at time $T_0$, i.e., $e_0$ equal to one and $e_{-1}$ and $e_1$ equal to zero in a normalized example.

Substituting into equation 1 the normalized values for the ideal corrected read signal ($e_{-1}$, $e_0$, $e_1$), along with typical normalized sample values of a transition pulse, yields:

$$\begin{vmatrix} 1 & 0.75 & 0.375 \\ 0.75 & 1 & 0.75 \\ 0.375 & 0.75 & 1 \end{vmatrix} \times \begin{vmatrix} f_{-1} \\ f_0 \\ f_1 \end{vmatrix} = \begin{vmatrix} 0 \\ 1 \\ 0 \end{vmatrix} \quad (2)$$

Solving the matrix equation (2) provides the following values for the equalizer transfer function:

$$\begin{aligned} f_{-1} &= -3.0 \\ f_0 &= 5.5 \\ f_1 &= -3.0 \end{aligned} \quad (3)$$

Such an equalizer transfer function can be represented by three impulses $F_{-1}$, $F_0$ and $F_1$, indicated at line F of FIG. 2b, having magnitudes corresponding to the tap weights $f_{-1}$, $f_0$, and $f_1$. For a more detailed exposition of equalization analysis, reference may be had to Lucky, Salz and Weldon, *Principles of Data Communication* (McGraw Hill, 1968), pp. 130 to 136 and 147 to 151.

The fact that the above equalization analysis yields equalizer impulse functions $F_{-1}$, $F_0$ and $F_1$ indicates that the effects of the write/read transfer function can be at least partially counteracted by employing an equalizer transfer function. In other words, the response of the equalizer transfer function ($F_{-1}$, $F_0$, $F_1$) to a Gaussian-shaped transition pulse of the input read signal would be an effectively narrower pulse, resulting in significantly reduced intersymbol cross talk. However, such an equalizer transfer function, composed as it is of impulse functions having an extremely wide frequency spectrum, would not be sufficiently band width-limited to satisfy the band width requirements of the pulse shaping network. Accordingly, the pulse shaping network must embody an equalizing network transfer function exhibiting a narrower band width.

Such a band width-limited network transfer function can be obtained by means of a Fourier approximation to the equalizer transfer function represented on line F of FIG. 2b (impulse functions $F_{-1}$, $F_0$ and $F_1$) in which the frequency spectrum of the network transfer function is confined to lower order harmonics. Straightforward Fourier analysis indicates that the equalizer transfer function ($F_{-1}$, $F_0$, $F_1$) can be approximated using only first and third half-period harmonics in accordance with the following relationship:

$$F(t) = K_1 \sin \pi t - K_3 \sin 3\pi t \quad (4)$$

where the first term corresponds to a finite time duration sine pulse of one-half cycle multiplied by the scaling factor $K_1$, and the second term corresponds to a finite time duration sine pulse of three-half cycles multiplied by the scaling factor $K_3$. The scaling factors $K_1$ and $K_3$ are chosen so that the corresponding ratio of the first order half-period harmonic ($\sin \pi t$) and the third order half-period harmonic ($\sin 3\pi t$) provides the best approximation to the equalization impulse functions $F_{-1}$, $F_0$ and $F_1$ having the normalized respective tap weight values $f_{-1}$, $f_0$ and $f_1$ derived above. That is, the ratio of the scaling factors $K_1$ and $K_3$ is chosen so that the Fourier approximation represented by equation 4 incorporates the tap weights $f_{-1}$, $f_0$ and $f_1$, of the equalizer transfer function. The result of this band width-limiting Fourier approximation is represented schematically at line G of FIG. 2b, where the dotted line represents the approximating network transfer function.

Those skilled in the art will recognize that the above described equalization analysis could readily be extended to yield a network transfer function including any number of half-period harmonics. For example, the equalization analysis could use a five tap weight approach to obtain a Fourier approximation to the resulting equalizer transfer function comprised of first, third and fifth half-period harmonics. While providing a network transfer function with a higher order harmonic content could result in an increased pulse slimming effect, the correspondingly wide frequency spectrum of the network transfer function unavoidably augments high frequency noise. For a preferred embodiment, the pulse shaping network embodies a network transfer function comprised of only first and third half-period harmonics in order to effect an optimum degree of pulse slimming, and thereby an optimum reduction in intersymbol cross talk, without significantly degrading the signal-to-noise ratio.

To summarize, in order to reduce intersymbol cross talk while at the same time providing band with limitation, the pulse shaping network of the present invention embodies a network transfer function that, in accordance with equation 4, corresponds to the scaled summation of first and third order half-period harmonic transfer functions whose impulse responses are finite time duration sine pulses of, respectively, one-half and three-half cycles. The synthesis of such a network transfer function is represented schematically in FIG. 2a. A filter 10 comprises a plurality of sections characterized by transfer functions whose impulse responses are finite time duration sine pulses of successively odd multiples of half cycles. Thus, the impulse response of a transfer function $TF_1$ is a sine pulse of one-half cycle, the impulse response of a transfer function $TF_3$ is a sine pulse of three-half cycles, the impulse response of a transfer function $TF_5$ is a sine pulse of five-half cycles, and so on. By multiplying the transfer functions $TF_1$ and $TF_3$ by, respectively, scaling factors $K_1$ and $K_3$, as specified by equation 4, and subtracting the resulting products, a network transfer function, indicated generally at 10', can be derived for the pulse shaping network of the present invention. In accordance with the equalization analysis described above, the harmonic content, including the scaling factors $K_1$ and $K_3$, can be determined so that the equalizing network transfer function given by equation 4 (and indicated schematically at 10' in FIG. 2) can be derived and implemented by a finite time duration sine pulse-forming filter. Accordingly, intersymbol cross talk between the transition pulses of the read signal is reduced, while at the same time the band width of the network response is limited so as to prevent any significant degradation of the signal-to-noise ratio.

A sine pulse-forming filter for use in the pulse shaping network of the present invention is described in an article published by one of the present inventors entitled *Trignometric Pulse-Forming Networks Revisted*, published in the July, 1972 issue of IEEE Transactions on Circuit Theory, which is hereby incorporated by reference. Disclosed therein is a method for synthesizing a multi-section filter such that each section approximates a half-period harmonic transfer function whose impulse response is a substantially finite time duration sine pulse of an odd number of half cycles. These sine pulses (normalized to have a unit time duration) can be expressed by the following relationships:

$$f(t) = \sin k\pi t \quad 0 < t < 1 \quad (5)$$
$$f(t) = 0 \quad t < 1, t < 0 \quad (6)$$

where k is an odd integer. (Only sine pulses with an odd number of half cycles are considered because of the symmetrical nature of the Gaussian-shaped transition pulses of the read signal). The half-period harmonic transfer functions corresponding to these sine pulses can be characterized by their Laplace transforms:

$$F_k(s) = \frac{K\pi}{S^2 + K^2\pi^2} \cdot \frac{2}{1 + \tanh S/2} \quad (7)$$

where, again, k is an odd integer.

The accurate approximation of these transfer functions can be accomplished utilizing tuned reactance functions (i.e., functions corresponding to circuit elements composed of inductors and capacitors) terminated by a correcting reactance function. Specifically, a sine pulse-forming filter can be synthesized from a parallel cascade of series LC sections terminated by a capacitor. Through the proper choice of the component parameters and the total number of sections, the LC section can be characterized by respective transfer functions whose impulse responses are sine pulses of an odd multiple of half cycles having a substantially finite time duration corresponding to the double density bit cell interval (two microseconds). In particular, the proper choice of a terminating reactance function (such as a terminating capacitor) significantly improves the convergence of the sine pulses to zero, thereby permitting a substantially finite time duration sine pulse-forming filter to be formed by a fewer total number of cascaded LC sections. A duration of two microseconds is chosen for the preferred embodiment because that represents the minimum interval between recording code transitions. However, a duration of less than two microseconds could be incorporated by appropriate component selection.

Figure 3:
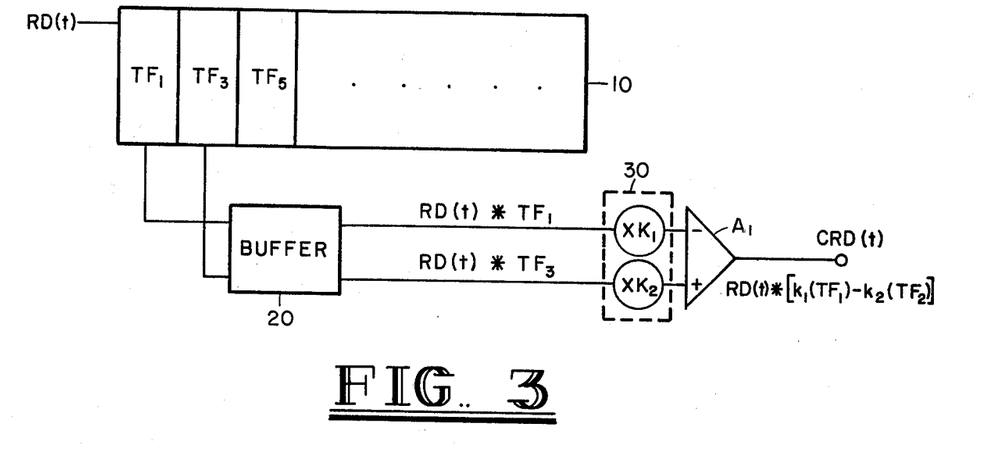
FIG. 3 is a schematic block diagram of the pulse shaping network.

Referring to the block diagram of FIG. 3, the pulse shaping network of the present invention comprises, in addition to sine pulse-forming filter 10, a buffer circuit 20, a scaling circuit 30 and a difference amplifier A1. As described previously, sine pulse-forming filter 10 comprises a parallel cascade of series LC sections characterized by respective transfer functions $TF_1$, $TF_3$, $TF_5$, and so on. A read signal RD(t) is applied to sine pulse-forming filter 10, and the responses of the first two LC sections of the filter (transfer functions $TF_1$ and $TF_3$) are separately tapped by the buffer circuit 20. The respective outputs from the buffer circuit 20 correspond to the convolution of the input read signal RD(t) with the transfer function $TF_1$ and with the transfer function $TF_3$.

After the scaling factors $K_1$, and $K_2$ are introduced by the scaling circuit 30, the convolution responses are subtracted by means of the difference amplifier A1. The output from difference amplfier A1 corresponds to the corrected read signal CRD(t), which can be represented by the following convolution relationship:

$$CRD(t) * [K_1(TF_1) - K_3(TF_3)] \quad (8)$$

where the term $$[K_1(TF_1) - K_3(TF_3)] \quad (9)$$

corresponds to the network transfer function of the pulse shaping network as given in equation 4. The corrected read signal CRD(t) is characterized by Gaussian-shaped transition pulses that have been effectively narrowed by convolution with the equalizing network transfer function represented in equation 9, thereby substantially eliminating intersymbol cross talk. Accordingly, the peak phases of the read signal transition pulses are corrected (and the peak amplitudes are equalized) so that the peaks occur at intervals corresponding to the transition intervals of the recorded data, as indicated by the waveform D in FIG. 1 having peaks occurring at times $t_0$, $t_1$, $t_2$ ... $t_8$.

Figure 4:
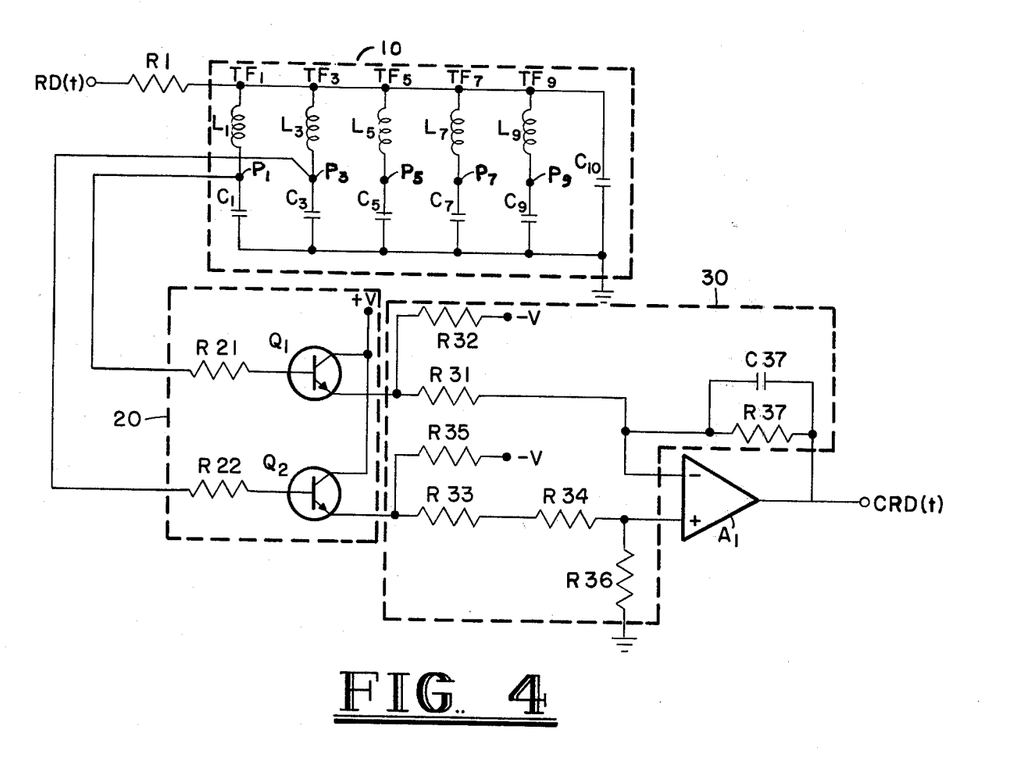
FIG. 4 is a circuit diagram of the pulse shaping network according to the present invention.

FIG. 4 indicates a circuit diagram for the pulse shaping network of the present invention. The read signal RD(t) from magnetic recording head is coupled through a resistor R1 to the sine pulse-forming filter 10. Sine pulse-forming filter 10 comprises a parallel cascade of five LC tuned sections formed by, respectively, inductor L1 in series with capacitor C1, inductor L3 in series with the capacitor C3, inductor L5 in series with the capacitor C5, inductor L7 in series with the capacitor C7, and inductor L9 in series with the capacitor C9, with the parallel cascade being terminated in a parallel connected capacitor C10. From the foregoing analysis of sine pulse-forming filters, the component parameters for sine pulse-forming filter 10 are chosen so that the L/C sections are characterized by respective transfer functions having impulse responses that are finite time duration sine pulses of, successively, one, three, five, seven and nine half cycles.

In order to insure that the series LC sections of the sine pulse-forming filter 10 are characterized by transfer functions that are substantially finite time duration sine pulses, the value of resistor R1 and the values of each of the inductors and capacitors that form the sine pulse-forming filter 10 must be carefully chosen. By performing the analysis disclosed in the hereinbefore referenced article, it can be established that the normalized component values (i.e., the component values that yield transfer functions whose impulse responses are sine pulses of a duration of one second) are designated by the following relationships:

$$R_1 = 1 \quad (10)$$
$$L_k = 0.25 \quad (11)$$
$$C_k = \frac{1}{k^2\pi^2} \quad (12)$$
$$C_{10} = 0.02047 \quad (13)$$

where k is an odd integer. The value of the terminating capacitor $C_{10}$ is derived by means of the curve fitting techniques disclosed in the article. While other terminating reactance functions (such as a terminating series LC section) can be utilized, providing sine pulse-forming filter 10 with a single terminating capacitor results in adequate convergence.

The normalized component values can be translated into actual values for a preferred pulse shaping as follows. R1 can be arbitrarily chosen subject to the limitations that its value not be so high as increase noise, and not be so low as to make it difficult to drive the sine pulse-forming filter 10. For a preferred embodiment, the value of R1 is set at 200 ohms. Once the value of R1 has been specified, the actual component values for the inductors and capacitors of the sine pulse filter 10 are chosen in accordance with the following relationships to provide a substantially finite time duration of two microseconds (the bit cell interval):

$$L_{actual} = L_{normal}\frac{T_{actual}}{T_{normal}}\frac{R_{actual}}{R_{normal}}$$
$$C_{actual} = C_{normal}\frac{T_{actual}}{T_{normal}}\frac{R_{normal}}{R_{actual}}$$

where $L_{normal}$ and $C_{normal}$ are the normalized values of inductance and capacitance given by equations 11, 12 and 13; $T_{actual}$ and $T_{normal}$ are, respectively the actual duration of two microseconds and the normalized duration of one second; and $R_{actual}$ and $R_{normal}$ are, respectively, the actual impedance of 200 ohms and the normalized impedance of one ohm.

The number of LC sections in the sine pulse-forming filter 10 (along with the choice of terminating capacitor $C_{10}$) determines the degree to which the respective responses of the LC sections are damped outside the pulse duration interval of two microseconds, and thereby determines the effectiveness of the pulse shaping network in eliminating intersymbol crosstalk. Accordingly, the total number of LC sections incorporated into sine pulse-forming filter 10 is a matter of design. For the preferred embodiment, a parallel cascade of five LC sections is disclosed. Specifying fewer LC sections would decrease the convergence to zero of the transfer functions associated with the remaining LC sections while additional LC sections would increase the converging effect.

The response for a given LC section appears at a point between the inductor and the capacitor of the LC section. Thus, the response of the L1/C1 section characterized by transfer function $TF_1$ appears at P1, the response of the L3/C3 section appears at P3, the response of the L5/C5 section appears at P5, the response of the L7/C7 section appears at P7, and the response of the L9/C9 section characterized by the transfer function $TF_9$ appears at P9. In accordance with the above described equalization analysis, the pulse shaping network of the present invention selectively taps the responses associated with, respectively, the L1/C1 section (at P1) and the L3/C3 section (at P3) corresponding to the convolution of the input read signal RD(t) with the transfer function $TF_1$ and the transfer function $TF_3$.

In order to selectively tap the responses of the L1/C1 and L3/C3 sections, the buffer circuit 20 is coupled to the point P1 in the L1/C1 section and to point P3 in the L3/C3 section. The point P1 is coupled through a resistor R21 to the base of a buffer transistor Q1, while the point P3 is coupled through a resistor R23 to the base of a buffer transistor Q3. Buffer transistors Q1 and Q3 permit the sine pulse-forming filter responses at P1 and P3 to be tapped without effecting the sine pulse-forming filter 10. The collectors of transistors Q1 and Q3 are both coupled to a positive bias supply +V, while the convolution responses associated with points P1 and P3 (i.e., the responses associated with the convolution of the read signal RD(t) and, respectively, transfer function $TF_1$ and $TF_3$) appear on the emitters of, respectively, buffer transistors Q1 and Q3.

The convolution responses appearing on the emitters of buffer transistors Q1 and Q3 are scaled by scaling circuit 30 and then applied to the inputs to difference amplifier A1. The emitter of transistor Q1 is coupled through a resistor R31 to the inverting input to amplifier A1, and through a resistor R32 to a negative bias supply −V. The emitter of transistor Q3 is coupled through a resistor R33 and a resistor R34 to the noninverting input to difference amplifier A1, and through a resistor R35 to a negative bias supply −V. The noninverting input to difference amplifier A1 is coupled through a resistor R36 to ground, while the inverting input to the difference amplifier is coupled to its output through the parallel connection of a resistor R37 and a capacitor C37. The output of the difference amplifier A1 comprises the corrected read signal CRD(t) output of the pulse shaping network of the present invention. From above, the corrected read signal CRD(t) corresponds to the response of the equalizing network transfer function (equation 9) to an input read signal RD(t). This equalizing function effectively narrows the Gaussian-shaped transition pulses of the read signal, thereby substantially eliminating intersymbol cross talk and permitting accurate and reliable information retrieval.

Resistors R31, R32, R33, R34, R35, R36 and R37 comprise a resistive voltage divider scaling network. The values of these resistors are chosen such that the convolution responses appearing on, respectively, the emitters of buffer transistors Q1 and Q3 are scaled according to the ratio of the scaling factors $K_1$ and $K_3$ specified by the previously described equalization analysis. For a preferred embodiment in which the tap weights of the equalizer transfer function ($f_{-1}$, $f_0$, $f_1$) are given by equations 3, an harmonic content ration $K_1/K_3$ of 1/0.45 provides a close Fourier approximation (equation 4) to the equalizer transfer function. Thus, the resistor values for the scaling network 30 are chosen to incorporate a 1/0.45 ratio of the first and third half-period harmonic responses applied to difference amplifier A1. Difference amplifier A1 then subtracts the scaled convolution responses in accordance with equation 4. Accordingly, the network transfer function (equation 9) of the pulse shaping network comprises a scaled combination in the above indicated ratio, of first and third half-period harmonic transfer functions.

As noted above, the harmonic content ration $K_1/K_3$ for the qualizing network transfer function is optimized for the equalizer tap weights $f_{-1}$, $f_0$ and $f_1$ given in equations 3. Those skilled in the art will recognize that different recording media will embody different write-/read transfer functions, and that, as a result, an equalization analysis will yield slightly different equalizer tap weights $f_{-1}$, $f_0$ and $f_1$. The present invention permits different recording media to be accomodated merely by altering the component values of the scaling network 30 to obtain an equalizing network transfer function optimized for the particular recording medium.

It should be noted that, because intersymbol cross talk is less pronounced when reading data recorded on the outer tracks of the recording medium, it may be desirable to vary the harmonic content ratio $K_1/K_3$ in order to selectively alter the harmonic content of the network transfer function. Specifically, for processing data read off the outer tracks of the recording medium, it may be desirable to reduce the contribution of the third half-period harmonic (TF$_3$) in the combined network transfer function by increasing the $K_1/K_3$ ratio. Such a selectable variation in the harmonic content ratio can be most readily provided by substituting a variable resistance for resistor R36. Such a variable resistance could comprise a plurality of resistors, selectively coupled to the noninverting input to difference amplifier A1 as by a plurality of FET switches responsive to a control signal designating the tract being read. Alternatively, a continually variable harmonic content ratio $K_1/K_3$ could be provided by means of a voltage controlled resistor, such as a voltage controlled FET in which the gate control voltage is a signal designating the track being read.

The present invention has been described in relation to a preferred pulse shaping network that utilizes a sine pulse-forming filter to provide a network transfer function comprised of a scaled sum of first and third half-period harmonic transfer functions. The network transfer function effectively equalizes the write/read transfer function characterizing the magnetic head and the recording medium, so as to counteract the intersymbol cross talk that results when digital information recorded in a double density format is read off the recording medium. The response of the network transfer function of the pulse shaping network to an input read signal is a corrected read signal in which the peak phases of the read signal transition pulses have been corrected (and the peak amplitudes equalized), thereby permitting the digital information to be accurately decoded.

While the invention has therefore been described with respect to a preferred embodiment, it is to be clearly understood by those or ordinary skill in the art that the invention is not limited thereto, but rather that the limits of the invention are to be intrepreted only in conjunction with the appended claims.

The embodiments of the invention in which an exclusive property or privilege is claimed are as follows:

1. In apparatus for reading encoded digital data recorded at high density as bivalent states of a moving magnetic medium and providing a read signal formed by a sequence of bivalent transition pulses, a pulse shaping network for the band width-limited processing of the read signal in order to substantially decrease intersymbol interference or cross talk without significantly degrading the signal-to-noise ratio, thereby obtaining a corrected read signal suitable for accurately decoding the information, said pulse shaping network comprising:

pulse shaping means, characterized by a network transfer function, for substantially decreasing intersymbol cross talk between transition pulses of an input read signal such that the response of the network transfer function is a corrected read signal in which peak phases are substantially corrected and peak amplitudes are substantially equalized;

said network transfer function corresponding in harmonic content to a combination of a predetermined number of suitably gain-scaled half-period harmonic transfer functions, each having an impulse response that is a substantially finite time duration sine pulse of an odd multiple of half cycles, the predetermined duration of each sine pulse being less than or substantially equal to the bit cell interval of the encoded digital data;

the harmonic content of said network transfer function being sufficiently band width-limited that the corrected read signal response of said network transfer function is substantially band width-limited, and the signal-to-noise ratio is not significantly degraded.

2. The pulse shaping network defined in claim 1 wherein the harmonic content of said network transfer function is optimized by incorporating gain-scaling factors derived according to an equalization analysis of the transition pulses of the read signal.

3. The pulse shaping network defined in claim 2 wherein said predetermined number of lower order half-period harmonic transfer functions comprises the first and third half-period harmonic transfer functions whose impulse responses are substantially finite time duration sine pulses of, respectively, one and three half cycles.

4. The pulse shaping network defined in claim 1 wherein said pulse shaping means comprises:

a sine pulse-forming filter, coupled to receive said read signal, comprising a cascade of a plurality of tuned reactance sections characterized by respective half-period harmonic transfer functions whose impulse responses are substantially finite time duration sine pulses of a successively odd multiple of half cycles, the predetermined duration of the sine pulses being less than or substantially equal to the bit cell interval of the recorded digital data;

buffer means for selectively tapping a predetermined number of said tuned reactance sections to provide a corresponding number of tapped convolution responses, each of said tapped convolution responses corresponding to the response of the associated half-period harmonic transfer function to the input read signal;

scaling means for gain-scaling each of said tapped convolution responses; and summing means for summing the gain-scaled, tapped convolution responses in order to obtain said corrected read signal.

5. The pulse shaping network defined in claim 4 wherein said scaling means provides optimum gain-scaling factors derived in accordance with an equalization analysis of the transition pulses of the input read signal.

6. The pulse shaping network defined in claim 5 wherein said buffer means selectively taps the convolution responses corresponding to the two of said tuned reactance sections characterized by first and third half-period harmonic transfer functions having impulse response sine pulses of, respectively, one and three half cycles.

7. The pulse shaping network defined in claim 4 wherein said cascade of a plurality of tuned reactance sections comprises a parallel cascade of a plurality of tuned series LC sections each formed by a capacitor in series with an inductor, with the convolution response for each of said LC sections appearing at a point between the associated capacitor and inductor.

8. The pulse shaping network defined in claim 4 wherein said cascade of a plurality of tuned reactance sections comprises:
- a parallel cascade of a plurality of tuned series LC sections each formed by a capacitor in series with an inductor; and
- a terminating capacitor in parallel with the said series LC sections;
- the convolution response for each of said LC sections appearing at a point between the associated capacitor and inductor.

9. The pulse shaping network defined in claim 8 wherein said scaling means provided optimum gain-scaling factors derived in accordance with an equalization analysis of the transition pulses of the input read signal.

10. The pulse shaping network defined in claim 8 wherein said buffer means selectively taps the convolution responses corresponding to the two LC sections characterized by impulse response sine pulses of, respectively, one and three half cycles.

11. The pulse shaping network defined in claim 10 wherein said scaling means applies optimum gain-scaling factors to said first and third harmonic convolution responses derived in accordance with an equalization analysis of the transition pulses of the read signal.

12. The pulse shaping network defined in claim 11 wherein said plurality of series LC sections comprises five series LC sections characterized by half-period harmonic transfer functions whose impulse responses are finite time duration sine pulses of, respectively, one, three, five, seven and nine half cycles.

13. The pulse shaping network defined in claims 6 and 12 wherein said scaling means comprises:
- a resistive voltage divider network operable to apply a predetermined gain-scaling factor to each of said tapped convolution responses.

14. In apparatus for reading encoded digital data recorded at high density as bivalent states of a moving magnetic medium and providing a read signal formed by a sequence of bivalent transition pulses, a pulse shaping network for the band width-limited processing of the read signal in order to substantially decrease intersymbol interference or cross talk without significantly degrading the signal-to-noise ratio, thereby obtaining a corrected read signal suitable for accurately decoding the information, the harmonic content of said network transfer function, as determined by said gain-scaled, tapped convolution responses, being sufficiently limited said pulse shaping network comprising;
- a sine pulse-forming filter, coupled to receive an input read signal, comprising a cascade of a plurality of tuned reactance sections characterized by respective half-period harmonic transfer functions whose impulse responses are substantially finite time duration sine pulses of a successively odd multiple of half cycles, the predetermined duration of the sine pulses being less than or substantially equal to the bit cell interval of the recorded digital data;
- buffer means for selectively tapping a predetermined number of said tuned reactance sections to provide a corresponding predetermined number of tapped convolution responses, each of said tapped convolution responses corresponding to the response of the associated half-period harmonic transfer function to the input read signal;
- scaling means for gain-scaling each of said tapped convolution responses; and
- summing means for summing the gain-scaled, tapped convolution responses to obtain a corrected read signal corresponding to the response of a synthesized network transfer function to the input read signal;
- said network transfer function being synthesized such that intersymbol cross talk between transition pulses of the input read signal is substantially decreased so as to substantially correct the peak phases and substantially equalize the peak amplitudes of the corrected read signal;
- the harmonic content of said synthesized network transfer function being sufficiently band width-limited that the corrected read signal response of said network transfer function is substantially band width-limited, and the signal-to-noise ratio is not significantly degraded.

15. The pulse shaping network defined in claim 14 wherein said scaling means provides optimum gain-scaling factors derived in accordance with an equalization analysis of the transition pulses of the input read signal.

16. The pulse shaping network defined in claim 15 wherein said buffer means selectively taps the two of said tuned reactance sections characterized by first and third half-period harmonic transfer functions having impulse response sine pulses of, respectively, one and three half cycles.

17. The pulse shaping network defined in claim 14 wherein said cascade of a plurality of tuned reactance sections comprises a parallel cascade of a plurality of tuned series LC sections each formed by a capacitor in series with an inductor, with the convolution response for each of said LC sections appearing at a point between the associated capacitor and inductor.

18. The pulse shaping network defined in claim 14 wherein said cascade of a plurality of tuned reactance sections comprises:
- a parallel cascade of a plurality of tuned series LC sections each formed by a capacitor in series with an inductor; and
- a terminating capacitor in parallel with the said series LC sections;
- the convolution response for each of said LC sections appearing at a point between the associated capacitor and inductor.

19. The pulse shaping network defined in claim 18 wherein said scaling means provides optimum gain-scaling factors derived in accordance with an equalization analysis of the transition pulses of the input read signal.

20. The pulse shaping network defined in claim 19 wherein said buffer means selectively taps the first and third harmonic convolution responses corresponding to the two LC sections characterized by impulse response sine pulses of, respectively, one and three half cycles.

21. The pulse shaping network defined in claim 20 wherein said plurality of series LC sections comprises five series LC sections characterized by half-period harmonic transfer functions whose impulse responses are finite time duration sine pulses of, respectively, one, three, five, seven and nine half cycles.

22. The pulse shaping network defined in claim 16 and 21 wherein said scaling means comprises:
- a resistive voltage divider network operable to apply a predetermined gain-scaling factor to each of said tapped convolution responses.

* * * * *